(12) United States Patent
Briot et al.

(10) Patent No.: US 8,388,720 B2
(45) Date of Patent: Mar. 5, 2013

(54) JOINTING CEMENT CONTAINING HOLLOW SPHERES, FOR A PARTICLE FILTER

(75) Inventors: Anthony Briot, Avignon (FR); Christophe Carrie, Avignon (FR); Gaëtan Champagne, Isle sur Sorgue (FR); Vincent Gleize, Avignon (FR)

(73) Assignee: Saint Gobain Centre de Recherches et d'Etudes Europeen, Courbevoie (FR)

( * ) Notice: Subject to any disclaimer, the term of this patent is extended or adjusted under 35 U.S.C. 154(b) by 812 days.

(21) Appl. No.: 12/304,153

(22) PCT Filed: Jun. 19, 2007

(86) PCT No.: PCT/FR2007/051459
§ 371 (c)(1), (2), (4) Date: Jun. 24, 2009

(87) PCT Pub. No.: WO2007/148011
PCT Pub. Date: Dec. 27, 2007

(65) Prior Publication Data
US 2010/0024368 A1 Feb. 4, 2010

(30) Foreign Application Priority Data
Jun. 19, 2006 (FR) ..................... 06 05437

(51) Int. Cl.
*B01D 50/00* (2006.01)
*B01D 39/14* (2006.01)
*B01D 39/06* (2006.01)
*B01D 24/00* (2006.01)
*F01N 3/00* (2006.01)

(52) U.S. Cl. .............. 55/523; 55/522; 55/524; 422/169; 422/170; 422/171; 422/172; 422/177; 422/178; 422/179; 422/180; 422/181; 422/182

(58) Field of Classification Search ............ 55/522–524; 422/169–172, 177–182; 60/297
See application file for complete search history.

(56) References Cited

U.S. PATENT DOCUMENTS
2004/0045267 A1 3/2004 Ichikawa et al.
2005/0011174 A1 1/2005 Hong et al.
(Continued)

FOREIGN PATENT DOCUMENTS
EP 0356800 A1 3/1990
EP 0357491 A2 3/1990
(Continued)

OTHER PUBLICATIONS

Ozcivici, Engin, et al., "Fabrication and Characterization of Ceramic Foams Based on Silicon Carbide Matrix and Hollow Alumino-Silicate Spheres", J AM Ceram Soc; Journal of the American Ceramic Society, Dec. 2005, vol. 88, No. 12, pp. 3338-3345, XP002422969.

(Continued)

*Primary Examiner* — Amber Orlando
(74) *Attorney, Agent, or Firm* — Young & Thompson

(57) ABSTRACT

Jointing cement intended in particular for fastening together a plurality of filter blocks of a filtering body for filtering exhaust gas particles of an internal combustion engine of a motor vehicle, the cement including, in percentages by weight relative to the weight of the mineral material, apart from possible water and a possible mineral resin,
between 30 and 90% of silicon carbide (SiC),
at least 3% of hollow spheres including, in percentages by weight and for a total of at least 99%, between 20 and 99% of silica ($SiO_2$) and between 1 and 80% of alumina ($Al_2O_3$),
at least 80% by number of the hollow spheres having a size of between 5 and 150 μm.

28 Claims, 1 Drawing Sheet

U.S. PATENT DOCUMENTS

| | | | |
|---|---|---|---|
| 2005/0076626 A1* | 4/2005 | Kudo et al. | 55/523 |
| 2005/0109023 A1* | 5/2005 | Kudo et al. | 60/311 |
| 2005/0247038 A1 | 11/2005 | Takahashi | |
| 2006/0051556 A1 | 3/2006 | Ohno | |
| 2006/0154021 A1 | 7/2006 | Ohno et al. | |
| 2006/0230732 A1* | 10/2006 | Kunieda | 55/523 |
| 2007/0126160 A1 | 6/2007 | Takahashi | |
| 2009/0035512 A1 | 2/2009 | Masukawa et al. | |
| 2009/0320427 A1 | 12/2009 | Bardon et al. | |

FOREIGN PATENT DOCUMENTS

| | | |
|---|---|---|
| EP | 0361238 A1 | 4/1990 |
| EP | 0 816 065 | 1/1998 |
| EP | 1 142 619 | 10/2001 |
| EP | 1316686 A2 | 6/2003 |
| EP | 1 479 881 | 11/2004 |
| EP | 1 612 197 | 1/2006 |
| EP | 2006266 A1 | 12/2008 |
| WO | 2005045210 A1 | 5/2005 |
| WO | WO 2006/106275 | 10/2006 |
| WO | 2007111281 A1 | 10/2007 |

OTHER PUBLICATIONS

International Search Report dated Feb. 6, 2008, in PCT application.

* cited by examiner

US 8,388,720 B2

JOINTING CEMENT CONTAINING HOLLOW SPHERES, FOR A PARTICLE FILTER

FIELD OF THE INVENTION

The invention concerns a cement, in particular a jointing cement intended for fastening together a plurality of filter blocks of a filtering body, in particular for filtering exhaust gas particles of an internal combustion engine of a motor vehicle, and in particular a cement intended to constitute a peripheral coating of the side surface of such a filtering body. The invention also concerns a filtering body, comprising a plurality of filter blocks fastened together by means of a joint inserted between said filter blocks, and shaped so as to oppose the passage of said exhaust gases between said filter blocks, wherein the joint is obtained from a cement or a mortar according to the invention.

BACKGROUND OF THE INVENTION

Before being evacuated into the atmosphere, the exhaust gases can be purified by means of a particle filter, such as that represented on FIGS. 1 and 2, known from the prior art. Identical references were used on the various figures to indicate identical or similar members.

A particle filter 1 is represented on FIG. 1 in a cross-section, according to the sectional plane B-B represented on FIG. 2, and, on FIG. 2, in a longitudinal cross-section according to the sectional plane A-A represented on FIG. 1.

The particle filter 1 classically comprises at least one filtering body 3, having a length L, inserted in a metal case 5.

The filtering body 3 can be monolithic. To improve its thermomechanical resistance, in particular during the regeneration phases, however, it proved to be advantageous that it results from the assembly and the machining of a plurality of blocks 11, referenced 11a-11i.

To manufacture a block 11, a ceramic material is extruded (cordierite, silicon carbide, . . . ) so as to form a porous honeycomb structure. The extruded porous structure classically has the form of a rectangular parallelepiped extending between two substantially square upstream 12 and downstream 13 faces, on which a plurality of adjacent, rectilinear and parallel channels 14 open.

After extrusion, the extruded porous structures are alternatively plugged on the upstream face 12 or the downstream face 13 by upstream 15s and downstream 15e plugs, respectively, as is well known, to form channels of "outlet channels" 14s and "inlet channels" 14e types, respectively. At the end of the outlet 14s and inlet 14e channels opposite to the upstream 15s and downstream 15e plugs, respectively, the outlet 14s and inlet 14e channels open up outwards through outlet 19s and inlet 19e openings, respectively, extending on the downstream 13 and upstream 12 faces, respectively. The inlet 14s and outlet 14e channels thus define internal spaces 20e and 20s, delimited by a side wall 22e and 22s, a sealing plug 15e and 15s, and an opening 19s or 19e opening outwards, respectively. Two adjacent inlet 14e and outlet channels 14s are in fluid communication by the common portion of their side walls 22e and 22s.

The blocks 11a-11i are assembled together by bonding through joints 27 made from ceramic cement, generally constituted of silica and/or silicon carbide and/or aluminum nitride. The assembly thus constituted can then be machined to take, for example, a round section. Preferably, a peripheral coating 27', or coating, is also applied so as to substantially cover all the side surface of the filtering body. The result is a cylindrical filtering body 3 with a longitudinal axis C—C, which can be inserted in the case 5, a peripheral joint 28, exhaust gas-tight, being placed between the external filter blocks 11a-11h, or, if necessary, the coating 27', and the case 5.

As the arrows represented on FIG. 2 indicate, the exhaust gas stream F enters the filtering body 3 through the openings 19e of the inlet channels 14e, crosses the filtering side walls of these channels to join the outlet channels 14s, then escapes outwards through the openings 19s.

After a certain time of use, the particles, or "soot", accumulated in the channels of the filtering body 3 increase the pressure loss due to the filtering body 3, and thus alter the performance of the engine. For this reason, the filtering body must be regularly regenerated, for example every 500 kilometers.

Regeneration, or "declogging", consists in oxidizing soot. To do this, it is necessary to heat it to a temperature allowing its ignition. The inhomogeneity of the temperatures within the filtering body 3 and the possible differences in nature of materials used for the filter blocks 11a-11i and joints 27 and 28, can then generate strong thermomechanical stresses, capable of causing cracks in the joints and/or in the filter blocks 11a-11i, decreasing the service life of the particle filter 1.

In particular, jointing cements comprising between 30 and 60% in weight of silicon carbide are known. The silicon carbide has a high thermal conductivity, advantageously making it possible to homogenize the thermal transfers. The silicon carbide however, has a relatively high dilation coefficient. The silicon carbide content of these jointing cements must thus be limited to ensure a thermomechanical strength which is adapted to the particle filters application.

It is known, from EP 0,816,065 for example, that incorporating ceramic fibers to the joining cement makes it possible to increase the elasticity of the joint, and thus the thermomechanical resistance of the assembled filtering body. The silicon carbide content in the cement is between 3 and 80% in weight. However, the presence of ceramic fibers represents a potential risk in terms of hygiene and safety, and makes recycling the filtering body more difficult. The use of biosoluble fibers could limit this risk. The effect of the latter on the resistance to thermomechanical stresses properties, in particular at a high temperature, is however weak. Moreover, the incorporation of fibers, in particular with a reduced presence of shot (infibrous particles), is particularly expensive.

Cements which do not contain ceramic fibers and presenting high amounts of silicon carbide are known, in particular for the jointing of filtering bodies. These cements are typically made of silicon carbide powder or grains, of a ceramic binder of CaO aluminate type for the cold-setting, and of a ceramic binding phase at high temperature. However, these cements present a weaker refractoriness when hot because of the presence of CaO aluminate, which weakens the joint during extreme stress, in particular during a complete regeneration.

Cements with high amounts of silicon carbide present, because of the presence of fine particles of this carbide, a certain sensitivity to oxidation in very severe conditions, for example at high temperature. Partial oxidation of cement leads to the formation of crystallized silica which affects its thermomechanical strength.

There is thus a need for a ceramic cement capable of effectively resisting to the thermomechanical stresses related to the application to the filtering of exhaust gases of combustion engines, in particular Diesel, having a high silicon carbide content in the absence of ceramic fibers, and an improved resistance to oxidation.

The aim of the present invention is to satisfy this need.

SUMMARY OF THE INVENTION

According to the invention, this aim is reached by means of a cement intended in particular for fastening together a plurality of filter blocks of a filtering body, for filtering exhaust gas particles of an internal combustion engine of a motor vehicle, or to be used as a peripheral coating for such a filtering body, said cement comprising, in percentages by weight relative to the total weight of the mineral material (including the silicon carbide), apart from possible water and a possible mineral resin, between 30 and 90% of silicon carbide (SiC),
at least 3%, preferably at least 5%, and, preferably less than 55%, preferably even less than 30%, of hollow spheres, at least 80% by number of said hollow spheres having a size between 5 and 150 µm.

Preferably, the hollow spheres are inorganic and, preferably, comprise in percentages by weight and for a total of at least 99%, between 20 and 99% of silica ($SiO_2$) and between 1 and 80% of alumina ($Al_2O_3$), In addition to a good resistance to thermomechanical stresses, the joint or the peripheral coating obtained by heat treatment of the ceramic cement according to the invention thus has a remarkable resistance to thermal fatigue, even in the absence of ceramic fibers and/or with a high silicon carbide content. Moreover, the cement according to the invention has an improved resistance to oxidation.

Preferably, the cement according to the invention further comprises one or more of the following optional characteristics:

The silicon carbide is present in the form of particles, whose median size is less than 200 µm, preferably less than 100 µm. Advantageously, the silicon carbide improves the chemical resistance, in particular towards the environment of the filter, the thermal conductivity and the rigidity of the joint when hot.

The cement comprises, in percentages by weight relative to the weight of the mineral material, apart from possible water and a possible mineral resin, at least 0.05%, preferably at least 0.1%, preferably still at least 0.2%, and/or less than 5% of a thermosetting resin, possibly with an adapted catalyst. Advantageously, the presence of thermosetting resin improves the mechanical strength of the joint or the peripheral coating, in particular when cold, which also advantageously makes it possible to limit the amount of lime based hydraulic binder. The longevity of the joint or the peripheral coating in their applications to filtering blocks is thus increased. Moreover, this improvement of the mechanical strength makes it possible to do without the presence of ceramic fibers and/or to increase the silicon carbide content.

The thermosetting resin is selected among epoxy, silicone, polyimide, phenolic and polyester resins.

The cement does not contain ceramic fibers.

The cement comprises between 0.1 and 2%, preferably less than 0.5% in weight of a dispersant, in percentages by weight relative to the weight of the mineral material, apart from possible water and a possible mineral resin.

Said silicon carbide content is greater than 60%, in percentage by weight relative to the weight of the mineral material, apart from possible water and a possible mineral resin.

The silicon carbide, alumina and silica represent at least 80%, preferably at least 95% in weight relative to the weight of the mineral material, apart from possible water and a possible mineral resin.

The cement comprises a lime (CaO) content less than 0.5% in weight relative to the weight of the mineral material, apart from possible water and a possible mineral resin. Advantageously, this low lime content does not harm to the properties of the cement.

The cement has an alumina content, preferably calcined, of between 5 and 25%, preferably between 10 and 25%, and/or a silica content, preferably in the form of silica smoke, of between 1 and 15%, preferably between 3 and 10%, in percentages by weight relative to the weight of the mineral material, apart from possible water and a possible mineral resin.

The composition of the cement, not including hollow spheres, includes a silicon carbide (SiC) content of between 30 and 90%, and/or an alumina ($Al_2O_3$) content of between 1 and 50%, and/or a silica ($SiO_2$) content of between 1 and 50%, in percentages by weight relative to the weight of the mineral material, apart from possible water and a possible mineral resin.

The invention also concerns a wet cement, or "mortar", resulting from the humidification of a dry cement according to the invention.

Preferably, the mortar has a water content of less than 40% and/or at least 10%, preferably at least 15%, in percentages by weight relative to the mineral weight, apart from water and a possible mineral resin.

The invention also concerns a filtering body, in particular for an exhaust gas particle filter of an internal combustion engine of a motor vehicle, comprising a plurality of filter blocks fastened together by means of at least one joint inserted between said filter blocks, and shaped so as to oppose to the passage of said exhaust gases between said filter blocks. This filtering body is remarkable in that the joint is obtained by heat treatment of a cement according to the invention.

Finally, the invention concerns a filtering body, in particular for an exhaust gas particle filter of an internal combustion engine of a motor vehicle, of single block type, or comprising a plurality of filter blocks fastened together by means of at least one joint inserted between said filter blocks, comprising a peripheral coating obtained by heat treatment of a cement according to the invention.

DETAILED DESCRIPTION OF THE INVENTION

Figure 1:
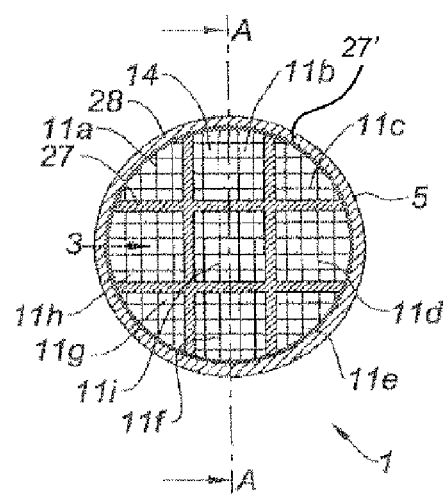
FIG. 1 depicts a particle filter in a cross-section along the sectional plane B-B of FIG. 2.
Figure 2:
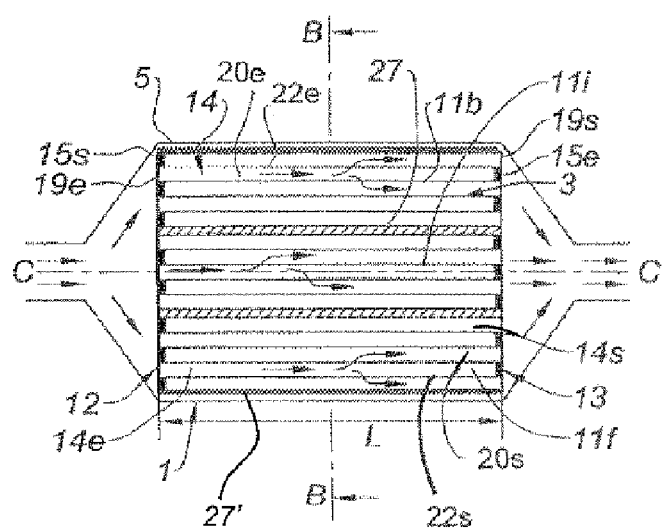
FIG. 2 depicts the particle filter in a longitudinal cross-section along the sectional plane A-A of FIG. 1.

"Cement" means a "moldable" composition, wet or formed by a dry particulate mixture, capable of solidifying after activation.

The cement is known as "activated" when it is in a solidification process. The activated condition classically results from a humidification of the cement with water. "Wet cement" or "mortar" is then obtained.

The solidification (hardening) of the mortar can result from a drying or, for example, hardening of the resin. The "hardened mortar" can then undergo rises in temperature, in particular during the heat treatment, which lead to a total evaporation of the water.

"Sphere" means a particle having a sphericity, i.e. a ratio between its smallest diameter and its largest diameter, equal to or greater than 0.75, however this sphericity was obtained. Preferably the spheres implemented according to the invention have a sphericity greater than or equal to 0.8, preferably greater than or equal to 0.9.

A sphere is known as "hollow" when it presents a central cavity, closed or opened outwards, whose volume represents at least 50% of the total external volume of the hollow spherical particle.

The "size" of a sphere or a particle is its greatest dimension.

Classically, the "median size of particles or of grains" or "median diameter of particles or grains" of a mixture of particles or of a group of grains, means the size D50 dividing the particles of this mixture or the grains of this group into first and second equal populations equal in number, these first and second populations only comprising particles or grains having a size, greater or less, respectively, than the median size.

"Thermosetting resin" means a polymer which can be transformed into an infusible and insoluble material after heat treatment (heat, radiation) or physico-chemical treatment (catalysis, hardener). The thermosetting materials thus take their final form with the first cooling of the resin, the reversibility of which being impossible.

Lastly, the "fiber" form of the elongated structures is typically of a diameter from 0.1 to 2 µm, and of a length going up to 1000 µm approximately.

Percentages are expressed in weight relative to the total weight of the mineral material (including the silicon carbide), apart from possible water and a possible mineral resin. In practice, the percentages are thus expressed by only taking into account basic mineral raw materials made from the dry mixture, without taking into account the mineral additions, in particular the possible mineral resins and water. These basic raw materials are in particular silicon carbide, mineral fibers, silica, calcium aluminate, hollow spheres, alumina, as indicated in the top portion of table 1 below.

A cement according to the invention is prepared according to conventional methods of cement manufacture.

The particulate materials are classically mixed until a homogeneous mixture is obtained.

They can include all the raw materials classically used to manufacture cements intended for refractory ceramic joints to assemble filter blocks. Preferably, the silicon carbide, alumina and silica represent at least 80%, preferably at least 95% of the total weight of the cement.

Preferably, the composition of the cement, not including the hollow spheres, includes between 30 and 90% of silicon carbide, between 1 and 50% of alumina and between 1 and 50% of silica, in percentages by weight relative to the weight of the mineral material, apart from possible water and a possible mineral resin, and preferably for a total of approximately 100%. These silica and alumina ranges facilitate the implementation of the cement and increase the mechanical strength after sintering. The silicon carbide range guarantees a good thermal conductivity.

According to a preferred embodiment of the invention, the cement comprises, in percentages by weight relative to the weight of the mineral material (including the silicon carbide), apart from possible water and a possible mineral resin,
- between 30 and 90% of silicon carbide (SiC),
- at least 3%, preferably between 5% and 30%, at most 55%, of hollow spheres containing, in percentages by weight and for a total of at least 99%, between 20 and 99% of silica ($SiO_2$) and between 1 and 80% of alumina ($Al_2O_3$), at least 80% by number of said hollow spheres having a size of between 5 and 150 µm.

The walls of a sphere are preferably solids or slightly porous, i.e. have a density greater than 90% of the theoretical density.

Preferably, the hollow spheres are spheres obtained by fusion or combustion of raw materials, for example of fly-ashes resulting from metallurgical methods, generally followed by a condensation step.

The hollow spheres are for example those marketed by Enviro-spheres under the name "E-spheres", which present a typical chemical composition of 60% of $SiO_2$ and 40% of $Al_2O_3$. They are classically used to improve the rheology of paintings or civil engineering concretes, or to constitute a mineral filler in order to reduce the cost of plastic products.

Preferably, the ratio R ($=D_{spheres}/D_{sic}$) between the median size of the spheres $D_{spheres}$ and the median size of the silicon carbide particles $D_{sic}$ is greater than 0.1, preferably greater than 0.2, preferably still greater than 0.5 and/or less than 30, preferably less than 10, preferably still less than 2. A ratio R of between 0.6 and 1.9 appears particularly suitable in the applications concerned. Such a ratio indeed improves the oxidation resistance, while guaranteeing a satisfactory compaction and porosity.

Within an embodiment, according to the invention, the median size of the hollow spheres is preferably greater than 80 µm, preferably greater than 100 µm and/or less than 160 µm, preferably still less than 140 µm. The median size of the hollow spheres is preferably still approximately of 120 µm.

In a preferred embodiment, the hollow spheres can be distributed according to the two following fractions, for a total of 100% in weight:
- a fraction representing 70% in weight of the hollow spheres, and having a median size greater than 110 µm, preferably greater than 120 µm, and/or less than 150 µm, preferably less than 140 microns, preferably approximately 130 µm, and
- a fraction representing 30% in weight of the hollow spheres, and having a median size greater than 35 µm, preferably greater than 40 µm, and/or less than 55 µm, preferably less than 50 microns, preferably approximately 45 µm.

Preferably still, the median size of the silicon carbide particles is greater than 20 µm, preferably greater than 45 µm, preferably still greater than 60 µm and/or less than 150 µm, preferably less than 120 µm, preferably still less than 100 µm.

Preferably, a thermosetting resin is incorporated in the form of a powder during this cement manufacture stage.

The thermosetting resins implemented according to the invention are selected in order to harden under predetermined conditions, and to not then melt during the use or the regeneration of the filtering body. Thus, they improve the strength of the joint to thermomechanical stresses during the whole service life of the filtering body.

Depending on the applications, it can be advantageous that the resin hardens at ambient temperature, for example after the addition of a catalyst, at the drying temperature or at the heat treatment temperature.

Preferably, the thermosetting resin further presents a sticking character before its hardening. It thus facilitates the placing of the cement and its maintenance in shape before the heat treatment. Preferably, it must have a viscosity of less than 50 Pa·s for a shearing gradient of 12 $s^{-1}$ measured with a Haake VT550 viscometer. Preferably, it must be water soluble at ambient temperature.

The thermosetting resin can be present in the cement according to the invention, in powdery form or in the mortar according to the invention in liquid form, the powdery form being preferred.

Preferably, the cement comprises more than 60% of silicon carbide, in percentage by weight relative to the weight of the mineral material, apart from possible water and a possible mineral resin. Indeed, the thermo-setting resin advantageously makes it possible to increase the silicon carbide content to contents greater than 60%, while preserving a satisfactory thermomechanical strength. The extraction of precious metals during the recycling of the filtering body is thus facilitated. The re-use of the silicon carbide is also simplified.

To facilitate the recycling, it is also preferable that the cement does not contain ceramic fibers.

The presence of a thermosetting resin in the cement according to the invention advantageously makes it possible to limit the ceramic binder content for the cold-setting. Thermally treated cement can thus present a CaO content of less than 0.5%, in percentage by weight. The weakening caused by CaO is thus advantageously limited. Preferably, the cement according to the invention does not comprise CaO.

Preferably, the cement further comprises between 0.1 and 0.5% in weight of a dispersant, in percentage by weight relative to the total weight of the cement. The dispersant can be for example selected among alkaline metal polyphosphates or methacrylate derivatives. All the known dispersants are possible, pure ionic, (for example HMPNa), pure steric, for example of sodium polymethacrylate type, or a ionic and steric combined type.

The addition of a dispersant makes it possible to better distribute the fine particles, with a size of less than 50 µm, and thus favours the mechanical resistance of the joint.

Preferably, the dispersant, or "deflocculating agent", is incorporated in the cement in powdery form.

In addition to the components mentioned above, the cement according to the invention can also comprise one or more shaping or sintering additives classically used, in the proportions well-known by one skilled in the art. As examples of additives which can be used, one can quote, in a non-restrictive way:
- organic temporary binders (i.e. completely or partially eliminated during the heat treatment), such as resins, cellulose or lignone derivatives, such as carboxymethylcellulose, dextrin, polyvinyl alcohols, etc;
- chemically setting agents, such as phosphoric acid, aluminum monophosphate, etc;
- sintering promoters, such as titanium dioxide or magnesium hydroxide;
- shaping agents, such as calcium or magnesium stearates.

The shaping or sintering additives are incorporated in variable proportions, but sufficiently small so as not to substantially modify the weight proportions of the various components featuring the cement or the mortar according to the invention.

The mixture obtained constitutes a deactivated cement according to the invention, and can be conditioned and marketed. Preferably, this mixture contains at least a portion of the various necessary powdery additives. A portion of the latter can however be added during a later step of mortar preparation.

In this last step, water is classically added to the particulate mixture. Preferably, one adds less than 40%, and/or at least 10%, preferably at least 15%, of water, in percentages by weight relative to the mineral weight of the cement, apart from water and a possible mineral resin. Preferably, the resin is dissolved in water to decrease its viscosity, then this mixture is added to the particulate mixture.

A catalyst of the resin can also be added during this step in order to accelerate the solidification of the resin. The catalysts, for example furfurylic alcohol or urea, are adapted to each type of resin and are well-known by one skilled in the art.

The wet mixture is then kneaded until a substantially homogeneous pasty mortar is obtained. The addition of water activates the cement according to the invention, i.e. starts its solidification process. The mortar obtained can then be inserted between the filter blocks of a filtering body or at the periphery of a filtering body.

Classically, after its placing between the filter blocks, the mortar is dried at a temperature preferably ranging from 100 to 200° C., preferably under air or a moisture-controlled atmosphere, preferably so that the residual moisture remains between 0 and 20%. Classically, the drying duration is between 15 minutes and 24 hours according to the format of the joint.

The dried mortar can then be hardened thermally. The heat treatment leads to the consolidation of the mortar. It classically consists in firing, preferably in an oxidizing atmosphere, preferably at atmospheric pressure, at a temperature between 400 and 1200° C., so as to form a sufficiently resistant joint. The heat treatment operation is well-known by one skilled in the art.

It is generally accompanied by a reduction in porosity and a dimensional withdrawal. The duration of the firing, generally approximately between 1 and 20 hours from cold to cold, is variable depending on the materials, but also on the size and the shape of the refractory joints to be manufactured.

Depending on the resin used, the hardening of the possible resin can be carried out at ambient temperature, at the preferable drying temperature, at the heat treatment temperature or can require radiation, for example with ultraviolet rays, or complementary heating.

The cement according to the invention proved not only adapted to fastening together filter blocks of a filtering body, intended for filtering exhaust gases of an internal combustion engine of a motor vehicle, but also to form the peripheral coating, classically placed on the peripheral side surface of the filtering bodies. Therefore, the invention also relates to the use of a cement according to the invention, to constitute the peripheral side coating of a filtering body, whether this one is a single block, i.e. not assembled, or on the contrary, constituted by the assembly of a plurality of filter blocks. The invention particularly concerns a filtering body comprising a plurality of filter blocks fastened together by means of a joint obtained from a cement according to the invention, and of which the peripheral side surface is covered with a coating obtained from the same cement.

The following examples, shown in tables 1 and 2, are provided on a purely illustrative and non-restrictive basis.

The tested mortars are prepared in a mixer of planetary, non-intensive type according to a traditional procedure, including:
- dry kneading, for 2 minutes, of the powders and grains with, if necessary, the dispersant, then
- an addition of water, possibly with a binder (polysaccharide) and, if necessary, a catalyst, then
- kneading for 10 minutes until a consistency sufficient for a jointing mortar application is obtained.

References 1, 2 and 3 ("Ref. 1", "Ref. 2" and "Ref. 3") relate to cements according to the prior art. Reference 2 corresponds to a fibrous cement according to example 1 of EP 0,816,065.

Examples 1 to 4 are cements according to the invention.

The samples of the mortars described in table 1 were dried at 120° C. for 12 hours, then treated thermally at 800° C. under air (2 hour stage). Open porosity was then measured in accordance with the ISO5017 standard.

The chemical analyzes were carried out on samples of cement dried at 120° C. and reduced to powder, which was pre-calcined under air at 750° C. for approximately 0.5 hours, according to the practice of preparation for chemical analysis, well known by one skilled in the art. The SiC content was more particularly measured by LECO.

The top portion of table 1 provides the composition of the basic raw materials made from a dry mixture of various tested cements, in percentages by weight. The "additions", and in particular the amount of water added to activate these cements and the resin, are expressed in percentages relative to the total weight of said raw materials.

Of course, the present invention is not limited to the described embodiments, provided on a purely illustrative and non-restrictive basis.

In particular, the presence of clay or ceramic fibers is not excluded. The cement according to the invention can also contain water-soluble fibers.

TABLE 1

|  | Ref. 1 | Ref. 2 | Ref. 3 | Ex. 1 | Ex. 2 | Ex. 3 | Ex. 4 | Ex. 5 | Ex. 6 | Ex. 7 |
|---|---|---|---|---|---|---|---|---|---|---|
| Raw materials made from the dry mixture | | | | | | | | | | |
| SiC powder (median diameter: 0.3 μm) | no | 50 | no | no | no | no | no | no | no | no |
| Silica-alumina fibers Length <100 μm <5% shot | no | 38.5 | No | no | No | no | No | no | No | no |
| Colloidal silica (at 30% of $SiO_2$) | No | 11.5 | no | No | no | No | no | No | no | no |
| Granular mixture of silicon carbide. Sizes between 0 and 0.5 mm; SiC content >98% | 80.0 | | 81.0 | 74.0 | 67.0 | 80 | 81.0 | 67.0 | 67.0 | 67.0 |
| Calcium aluminate (CA270) | 5.0 | no | no | no | no | 5.0 | no | no | no | No |
| Hollow spheres Diameter D50 = 120 μm $AL_2O_3$ = 32% $SiO_2$ = 67% impurities = 1% approximately | no | no | no | 8.0 | 24.0 | 5.5 | 5.5 | 24 | 24 | |
| Hollow spheres Diameter D50 = 45 μm $AL_2O_3$ = 32% $SiO_2$ = 67% impurities = 1% approximately | | | | | | | | | | 24 |
| Calcined alumina | 10.0 | no | 13.0 | 12.0 | 3.0 | 6.5 | 11.0 | 3 | 3 | 3 |
| Silica smoke | 5.0 | no | 6.0 | 6.0 | 6.0 | 3.0 | 2.5 | 6 | 6 | 6 |
| Total mineral weight | 100 | 100 | 100 | 100 | 100 | 100 | 100 | 100 | 100 | 100 |
| Additives | | | | | | | | | | |
| Epoxy resin (powder) | | | +0.2 | +0.2 | +0.2 | | +0.2 | +0.2 | +0.2 | +0.2 |
| Polysaccharide: powdery methylcellulose derivatives | +0.5 | +0.5 | +0.2 | +0.2 | +0.4 | +0.5 | +0.2 | +0.4 | +0.4 | +0.4 |
| Deflocculating agent/dispersant in powder | no | no | +0.3 | +0.3 | +0.3 | no | +0.3 | +0.3 | +0.3 | +0.3 |
| Resin catalyst (liquid) | no | no | +0.8 | +0.8 | +1.6 | no | +0.8 | +1.6 | +1.6 | +1.6 |
| Water | +30 | +39 | +17.5 | +21 | +37 | +29.5 | +18.0 | +38 | +43 | +40 |
| Results of the tests and measurements | | | | | | | | | | |
| Median diameter of the granular mixture of silicon carbide | 70 | 0.3 | 70 | 70 | 70 | 70 | 70 | 25 | 3.5 | 25 |
| Ratio R (hollow spheres median diameter/SiC powder median diameter) | 0 | 0 | 0 | 1.7 | 1.7 | 1.7 | 1.7 | 4.8 | 35 | 1.8 |
| Open porosity measured according to ISO5015 on a sample of thermally treated cement at 800° C./air | 41 | 38.0 | 40.7 | 40.8 | 42.0 | 43.2 | 42.4 | 45.1 | 53 | 47 |
| Oxidation resistance 200° C./hour −1450° C. on thermally treated cement at 800° C./air weight gain % | +2.5 | +4.9 | +1.9 | +1.6 | +1.6 | +2.3 | +1.7 | +2.0 | +4.5 | +1.8 |
| Calcined composition 750° C./0.5 hours | | | | | | | | | | |
| SiC | 78.0 | 57.0 | 79 | 72 | 65 | 78 | 79 | 64 | 63 | 64 |
| $Al_2O_3$ | 12.0 | 15.0 | 12.9 | 13.8 | 11.1 | 12.1 | 13.2 | 11.0 | 11.1 | 11.0 |
| $SiO_2$ | 7.5 | 25.0 | 7.1 | 13.0 | 22.8 | 7.4 | 6.9 | 23.7 | 24.6 | 23.7 |
| CaO | 1.0 | <1.0 | <1.0 | <1.0 | <1.0 | 1.0 | <1.0 | <1.0 | <1.0 | <1.0 |
| Other species, including impurities | 1.5 | <2.0 | 1.0 | <1.0 | <1.0 | 1.5 | <1.0 | <1.0 | <1.0 | <1.0 |

Table 1 also summarizes the results of various characterization tests of pre-treated cement according to the oxidation test at 1450° C. under air on a cement sample pre-fired at 800° C.

Table 1 shows that the properties of thermally treated materials, obtained from cements or mortars according to the invention have, with substantially identical compositions, an improved oxidation resistance from the moment that hollow spheres were added to the mixture.

However, the increase in the ratio R limits the effect of the addition of spheres on the oxidation resistance, as example 6 shows. Preferably, the ratio R is thus less than 30.

The invention claimed is:

1. A filtering body comprising a cement, the cement comprising, in percentages by weight relative to a weight of mineral material, apart from possible water and a possible mineral resin: between 30 and 90% of silicon carbide (SIC), and at least 3% of hollow spheres, at least 80% by number of said hollow spheres having a size between 5 and 150 μm, wherein the cement fastens together a plurality of filter blocks of the filtering body for filtering exhaust gas particles of an internal combustion engine of a motor vehicle, and/or forms a peripheral coating for the filtering body.

2. The filtering body according to claim 1, wherein said hollow spheres of the cement comprise, in percentages by weight and for a total of at least 99%, between 20 and 99% of silica ($SiO_2$) and between 1 and 80% of alumina ($Al_2O_3$).

3. The filtering body according to claim 1, wherein the cement comprises at least 5% of said hollow spheres.

4. The filtering body according to claim 1, wherein the cement comprises a lime (CaO) content of less than 0.5%, expressed as a percentage by weight relative to the weight of the mineral material, apart from possible water and a possible mineral resin.

5. The filtering body according to claim 1, wherein the silicon carbide is present in the cement in the form of particles having a median size of less than 200 pm.

6. The filtering body according to claim 1, wherein the cement comprises at least 0.05% and less than 5% of a thermosetting resin, in percentages by weight relative to the weight of the mineral material, apart from possible water and a possible mineral resin.

7. The filtering body according to claim 1, wherein the cement comprises: 60% to 90% of silicon carbide, in weight relative to the weight of the mineral material apart from possible water and a possible resin, and 3% to 30% of hollow spheres.

8. The filtering body according to claim 1, wherein there are no ceramic fibers present in the cement.

9. The filtering body according to claim 1, wherein the cement comprises silicon carbide, alumina and silica, wherein the silicon carbide, alumina and silica represent at least 95%, in weight relative to the weight of the mineral material, apart from possible water and a possible mineral resin.

10. The filtering body according to claim 1, wherein the cement further comprises a water content of less than 40%, in weight relative to the mineral weight, apart from possible water and a possible mineral resin.

11. The filtering body according to claim 1, wherein the cement further comprises, not including the hollow spheres, at least one of an alumina ($Al_2O_3$) content of between 1 and 50%, and a silica ($SiO_2$) content of between 1 and 50%, in percentages by weight relative to the weight of the mineral material, apart from possible water and a possible mineral resin.

12. The filtering body according to claim 1, the cement presenting a ratio (R) between median size of the hollow spheres and median size of silicon carbide particles, greater than 0.1 and less than 30.

13. The filtering body according to claim 12, said ratio (R) being greater than 0.2 and less than 10.

14. The filtering body according to claim 12, said ratio (R) being greater than 0.5 and less than 2.

15. The filtering body according to claim 12 said ratio (R) being between 0.6 and 1.9.

16. The filtering body according to claim 12, a median size of the hollow spheres in the cement being between 80 and 160 μm and/or a median size of silicon carbide particles in the cement being between 50 μm and 150 μm.

17. The filtering body according to claim 12, a median size of the hollow spheres in the cement being between 100 and 140 μm and/or a median size of the silicon carbide particles in the cement being between 80 μm and 100 μm.

18. The filtering body according to claim 1, wherein the hollow spheres in the cement are distributed according to the two following fractions, for a total of 100% in weight: a first fraction representing 70% in weight of the hollow spheres, and the spheres having a median size greater than 110 μm and less than 150 μm, and a second fraction representing 30% in weight of the hollow spheres, and the spheres having a median size greater than 35 μm and less than 55 μm.

19. The filtering body according to claim 7, wherein there are no ceramic fibers present in the cement.

20. The filtering body according to claim 19, wherein the cement comprises at least 0.05% and less than 5% of a thermo-setting resin, in percentages by weight relative to the weight of the mineral material, apart from possible water and a possible mineral resin.

21. The filtering body according to claim 20, wherein the cement comprises a lime (CaO) content of less than 0.5%, expressed as a percentage by weight relative to the weight of the mineral material, apart from possible water and a possible mineral resin.

22. A filtering body for an exhaust gas particle filter of an internal combustion engine of a motor vehicle, comprising a plurality of filter blocks fastened together by means of at least one joint inserted between said filter blocks, and shaped so as to oppose passage of said exhaust gases between said filter blocks, wherein: the joint is obtained by heat treatment of a cement and/or the filtering body comprises a peripheral coating obtained by heat treatment of a cement, said cement comprising, in percentages by weight relative to a weight of mineral material, apart from possible water and a possible mineral resin: between 30 and 90% of silicon carbide (SiC), and at least 3% of hollow spheres, at least 80% by number of said hollow spheres having a size between 5 and 150 μm.

23. The filtering body according to claim 1, wherein the filter body is a single-block filtering body, for an exhaust gas particle filter of an internal combustion engine of a motor vehicle, and the cement forms comprising a peripheral coating for the filtering body.

24. The filtering body according to claim 1, said hollow spheres in the cement being inorganic.

25. The filtering body according to claim 12, said hollow spheres in the cement being inorganic.

26. The filtering body according to claim 1, wherein there is no colloidal silica present in the cement.

27. The filtering body according to claim 12, wherein there is no colloidal silica present in the cement.

28. The filtering body according to claim 1, the cement presenting a ratio (R) between median size of the hollow spheres and median size of silicon carbide particles of less than 30, said hollow spheres being inorganic.

* * * * *

UNITED STATES PATENT AND TRADEMARK OFFICE
CERTIFICATE OF CORRECTION

PATENT NO.        : 8,388,720 B2                                        Page 1 of 1
APPLICATION NO.   : 12/304153
DATED             : March 5, 2013
INVENTOR(S)       : Briot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 998 days.

Signed and Sealed this
First Day of September, 2015

Michelle K. Lee
*Director of the United States Patent and Trademark Office*